May 20, 1969     MARIE-JOSEPH F. L. LIGNE     3,444,773
RELEASABLE CONNECTION DEVICE
Filed April 22, 1966
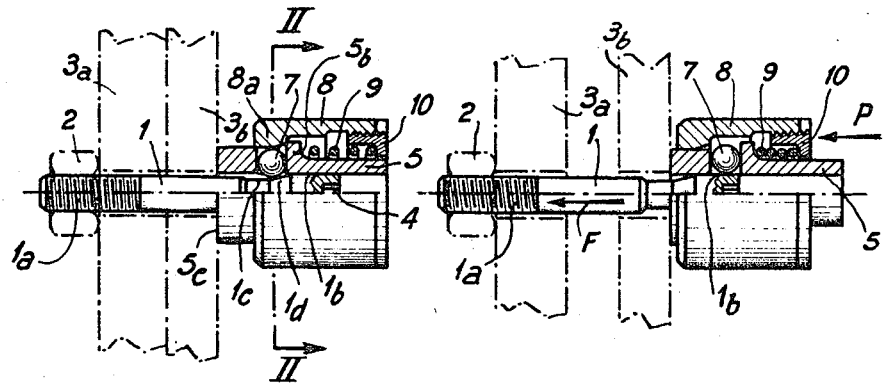
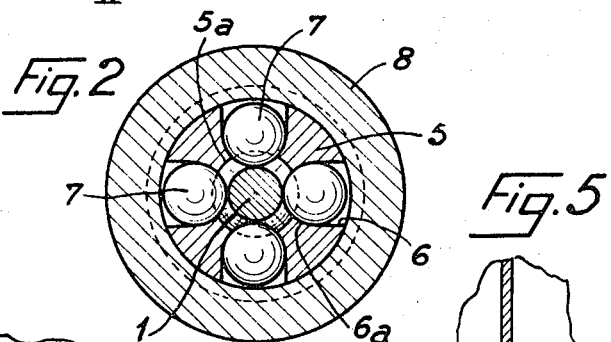
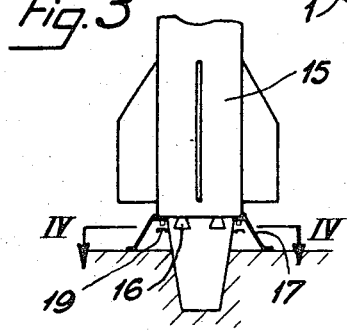
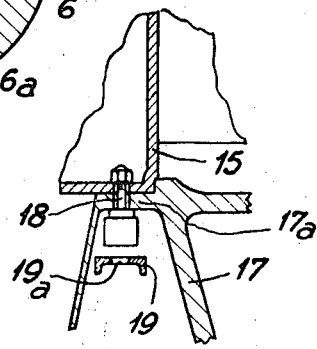
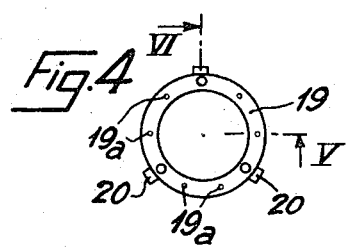
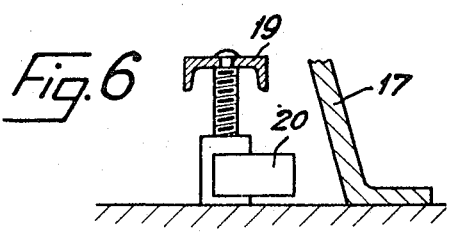

United States Patent Office 3,444,773
Patented May 20, 1969

3,444,773
RELEASABLE CONNECTING DEVICE
Marie-Joseph F. L. Ligné, Versailles, Yvelines, France, assignor to Sud-Aviation, Societe Nationale de Constructions Aeronautiques, Paris, France, a French body corporate
Filed Apr. 22, 1966, Ser. No. 544,553
Claims priority, application France, May 6, 1965, 16,095
Int. Cl. F16b *19/00, 37/08;* F41f *3/04*
U.S. Cl. 85—9                                    1 Claim

ABSTRACT OF THE DISCLOSURE

A detent releasable clamping device having a pin, one end of which is screwed to a clamping nut while the other end (adapted for rotary tightening vs. said nut to clamp together plural elements—e.g. a device to a support), comprises a frusto-conical thickening for the bearing against a head via a detent ball device. In said latter device, the balls are located in radial holes of a tubular member encircling the thickening and maintained in inwardly protruding condition by an annular slide fitted on the tubular member and spring urged in nonrelease position.

---

The invention relates to a rapid-release connecting device used for the temporary connection to one another of two or more elements by using aligned apertures and clamping these elements against one another. This device is so arranged that it allows the simultaneously release, from a distance, of any desired number of devices of this type arranged with their axes parallel to one another.

Rapid-release connecting device are already known which comprise a pin inserted within aligned apertures in the elements to be connected together, the said pin cooperating laterally with balls which project to retain the pin and withdraw within housings under the action of a mobile member which itself is subjected to the action of a spring.

The invention has as its object to provide a connecting device of this kind wherein one end of the pin is screwthreaded in order to enable the connected parts to be locked together by screwing, it being possible to release the connection by a simple pressure exerted on the mobile member of the device which holds the balls in the active position.

The connecting device according to the invention comprises a small number of components of geometrically simple type and the screwthreaded pin can be engaged in a nut, an internally screwthreaded part, or in a device comprising a plate and a nut incorporated in it. It is possible to effect screwing in parts which are difficult of access, the application of the clamping torque being effected by means of an ordinary tool. Finally, the device according to the invention is such that any local deformations due to accidental stresses do not compromise the rapid-release operation.

The connecting device according to the invention comprises a cylindrical pin one end of which is screw-threaded whereas the other is adapted for being manipulated in rotational movement by a tool, the said other end, provided with a groove, extending through the axial passage of a tubular head provided with radial housings in which are engaged balls the diameter of which is greater than the thickness of the said tubular head at the bearing side, an annular slide, surrounding the said head and comprising a portion of reduced internal diameter corresponding to the external diameter of the head in the head portion which comprises the radial cavities, being held by a spring bearing against the head in the position in which the housings are masked by the said portion of reduced diameter.

Thus, when the reduced-diameter portion of the slide covers the head portion comprising the radial housings, the balls are obliged to project into the interior of the axial passage, so that, engaged in the groove in the path, they prevent any axial displacement of the said pin.

The parts which are to be connected together, therefore, can be clamped against one another by screwing a screwthreaded element on to the pin, the said pin being held by bearing contact of its groove against the balls, and the screwing operation being rendered possible by suitable arrangement of the end of the pin engaged in the tubular head.

Preferably, the head comprises a collar beyond its radial housings and, the spring coming to bear against the outer face of the collar to push the slide towards the exterior, the reduced-diameter portion of the slide comes to abut against the internal face of the said collar.

In this case, the radial housings comprise advantageously, towards the axial passage, apertures which are smaller than the diameter of the balls so that when the slide is shifted in opposition to the action of the spring, after release of the pin, the balls remain retained in their housings.

A device of this kind can be used in all cases where, for reasons of safety and operational reasons, a mechanical assembly is to be quickly isolated, opened or released. The possibility of simultaneously unlocking, from a distance, a large number of these devices by a pressure applied simultaneously to each of the slides makes it possible to extend the field of use. Thus, by way of example, this device can be used for releasing a missile at take-off.

The invention is illustrated by way of example in the accompanying drawings, in which:

FIGURES 1*a* and 1*b* show respectively in the connected position and in the position of release a device according to the invention illustrated in longitudinal sectional view.

FIGURE 2 is a sectional view taken on II—II of FIGURE 1*a*.

FIGURE 3 is a partial elevation of a ballistic missile on its base, shown in section.

FIGURE 4 is a partial view in section taken on IV—IV of FIGURE 3.

FIGURE 5 is a sectional view taken on V of FIGURE 4 and the elements surrounding it.

FIGURE 6 is a sectional view taken on VI of FIGURE 4.

The device shown in FIGURES 1*a*, 1*b* and 2 comprises a substantially cylindrical pin 1 one end of which 1*a* is screwthreaded to receive for example a nut 2, whereby a plurality of elements 3 (3*a*–3*b*) which are adjacent one another and provided with apertures registering with one another for the passage of this pin can be clamped together. These apertures, however, are of a distinctly larger diameter than that of the pin.

The other end of the pin is arranged to permit a torque to be applied to the said pin. For this purpose this end comprises in the illustration shown, a hexagonal socket 4. This socket could be replaced by a simple slot or cross-shaped slots for the insertion of a screw driver.

The end portion 1*b* of the pin is of a diameter slightly greater than the remainder of the pin, these two portions being separated by a groove 1*c* the depth of which corresponds advantageously to the dedendum circle diameter of the screwthreaded portion 1*a*; the bottom of the groove is connected to the portion 1*b* by a frusto-conical portion 1*d*.

The pin end comprising the groove extends through the axial passage of a tubular head 5, the diameter of this passage corresponding to that of the portion 1*b*. This head (FIGURE 2) comprises in the embodiment illustrated four radial housings 6 arranged in cross-shaped formation, the form of these housings being that of a cylindrical bore terminating in a spherical zone 6a towards the interior.

Thus, balls 7 which are arranged in these housings can project into the interior of the central passage 5a of the head without being able to escape through this passage.

In the active position of the device (FIGURE 1a), the frusto-conical portion 1d of the pin 1 bears against the projecting portions of these balls.

The balls are held projecting by the reduced-diameter portion 8a of an annular slide 8. Between the head 5 and the slide 8 is arranged the spring 9 which, bearing on the one hand against the collar 5b of the head, and on the other hand against a likewise annular plug 10 screwed on to the slide, normally applies the internal edge of the reduced-diameter portion 8a against the said collar.

Preferably, the cylindrical bore of this portion 8a is flared conically beyond the ball bearing area in the locking position towards the internal edge so that the unclamping force is applied during a short travel of the slide 8, which makes it possible to reduce the magnitude of this force for effecting the complete translational movement of the said slide.

In FIGURE 1a it will be clear that by clamping the nut 2 (directly or by rotation of the pin 1 if the nut 2 is fixed), the frusto-conical portion 1d is pressed against the balls 7 and these entrain the head 5 so that its face 5c bears in the manner of a conventional bolt head against the external face of the parts 3.

Therefore, the clamping effect obtained is similar to that which is obtained with a headed bolt.

However, if the slide 8 is made to move, by a pressure P exerted against the plug 10 in opposition to the spring 9, into the position shown in FIGURE 1b, the balls 7 escape into the widened portion of the slide and, under the action of the force F, applied for example by the part 3a, the pin 1 is entrained in the axial passage of the head and the connection is released.

It may be noted that at least the part 3b which is in contact with the head 5 is to comprise, in order to permit this release, an aperture having a diameter slightly greater than that of the pin portion 1b.

FIGURES 3 to 6 show an example of using this connecting device.

A missile 15 provided with propulsive nozzles 16 rests on the ring 17a of a supporting stand 17 which is shown in section. It is fixed to the said ring by a certain number of connecting devices 18 according to the invention, 6 in the present case. Arranged below these devices is an unclamping or release ring 19 which can be lifted by a certain number of suitably distributed jacks 20, preferably synchronised screw jacks, so as to effect the shifting of the ring 19 without any tilting.

The ring 19 is perforated with apertures 19a which are arranged co-axially with connecting devices 18 of a diameter slightly greater than the diameter of the head 5 of the connecting device so as to support and shift the slide 8. FIGURE 4 is a plan view of the ring 19. It shows the distribution of the apertures 19a and the jacks 20.

Thus, the missile is fixed to its supporting stand until the operation of the ring 19 releases it simultaneously from all its connecting devices.

It will be apparent that modifications may be made to the forms of embodiment which have just been described, more particularly by substitution of equivalent technical means, without thereby departing from the framework of the present invention. Thus, for example, in the case of more powerful devices, requiring a more considerable clamping force, the end of the pin opposite from the screw-threaded portion may be elongated and project from the tubular head in the form of a hexagon or square head in order to be operated by a spanner.

I claim:
1. A releasable connecting device, comprising a cylindrical pin one end of which is screwthreaded, the other end being provided with a fitting for rotation of said pin by a suitable tool, the end portion of said pin adjacent said fitting being of greater diameter than the remainder of said pin and being joined thereto by a frusto-conical portion; a tubular head slidably mounted on the said portion of said pin of said greater diameter; said head in the proximity of said frusto-conical portion of said pin being provided with radial housings, balls contained in said housings, said housings being shaped to permit limited protrusion interiorly of said head by said balls sufficient for locking contact between said balls and said frusto-conical portion of said pin; an annular slide surrounding said head, said slide having a neck portion of sufficiently restricted diameter to cause said balls to protrude inwardly of said radial housings into said locking contact when held in register therewith, and a spring mounted between said head and said slide normally urging said neck portion into register with said balls and normally preventing the removal of said head and said slide from said pin when the said head and pin have been clamped to elements selected for retention together, one of said elements being a support and another of said elements being an apparatus to be released therefrom; actuating means movable into contact with said slide for shifting said slide to release said pin, and power means for driving said actuating means, said actuating means is provided with a plurality of contact areas spaced apart at selected intervals for simultaneously actuating a plurality of said connecting devices; said contact areas being provided with apertures of sufficient diameter to avoid contact with the tubular heads of said connecting devices; release of said head from said pin being provided by forced movement of said slide to overcome action of said spring, thus moving the neck portion of said slide out of register with said balls, and thus releasing said balls from locking contact with said pin.

References Cited

UNITED STATES PATENTS

| 2,069,377 | 2/1937 | Matthiessen | 285—277 |
| 2,503,495 | 4/1950 | Koester | 85—5 |
| 2,518,542 | 8/1950 | Hansen | 285—316 |
| 1,470,608 | 10/1923 | Hine | 85—9 |
| 1,551,382 | 8/1925 | Foss | 85—9 |
| 2,815,971 | 10/1957 | Guinane | 85—5 |
| 3,024,703 | 3/1962 | Herold | 89—1.811 |
| 3,038,383 | 6/1962 | Tiesenhausen | 89—1.806 |
| 3,063,063 | 11/1962 | Brooks | 85—5 |

FOREIGN PATENTS

| 734,988 | 8/1955 | Great Britain. |
| 971,537 | 9/1964 | Great Britain. |

EDWARD C. ALLEN, Primary Examiner.

U.S. Cl. X.R.

85—36; 89—1.806